United States Patent
Tang

(10) Patent No.: US 11,350,432 B2
(45) Date of Patent: *May 31, 2022

(54) METHOD AND DEVICE FOR DETERMINING TIME-DOMAIN RESOURCES, STORAGE MEDIUM, AND SYSTEM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 35 days.

This patent is subject to a terminal disclaimer.

(21) Appl. No.: 16/625,980

(22) PCT Filed: Aug. 31, 2018

(86) PCT No.: PCT/CN2018/103458
§ 371 (c)(1),
(2) Date: Dec. 23, 2019

(87) PCT Pub. No.: WO2019/052348
PCT Pub. Date: Mar. 21, 2019

(65) Prior Publication Data
US 2020/0170028 A1    May 28, 2020

(30) Foreign Application Priority Data
Sep. 14, 2017  (WO) ............... PCT/CN2017/101786

(51) Int. Cl.
*H04W 4/00*     (2018.01)
*H04W 72/12*    (2009.01)
(Continued)

(52) U.S. Cl.
CPC ..... *H04W 72/1257* (2013.01); *H04W 72/042* (2013.01); *H04W 72/0446* (2013.01);
(Continued)

(58) Field of Classification Search
CPC ............ H04W 72/1257; H04W 76/27; H04W 72/042; H04W 72/0446; H04W 72/0493;
(Continued)

(56) References Cited

U.S. PATENT DOCUMENTS 8,537,760 B2 *  9/2013  Tee ...................... H04L 5/0012
                                                   370/329
9,686,798 B1    6/2017  Zhao et al.
(Continued)

FOREIGN PATENT DOCUMENTS

CN    101299634 A    11/2008
CN    102088786 A     6/2011
(Continued)

OTHER PUBLICATIONS

International Search Report in the international application No. PCT/CN2018/103458, dated Dec. 5, 2018.
(Continued)

*Primary Examiner* — Stephen M D Agosta
(74) *Attorney, Agent, or Firm* — Perkins Coie LLP

(57) ABSTRACT

A method and device for determining time-domain resources, a storage medium, and a system. The method comprises: receiving allocation information of time-domain resources to be scheduled, which is sent by a network device (S401), the time-domain resources to be scheduled comprising time-domain resources for performing channel transmission; determining time-domain positions corresponding to the time-domain resources to be scheduled according to a set determining rule and uplink and downlink time-domain resource configuration information and the allocation infor-
(Continued)

mation (S402); and performing, by means of the time-domain resources to be scheduled, channel transmission according to the time-domain positions corresponding to the time-domain resources to be scheduled (S403). The condition of failure to transmit a channel by a terminal in a short time period due to a conflict with time-domain configuration information when the terminal performs channel transmission is avoided, signaling overheads when the terminal performs channel transmission with the base station are reduced, and the increase of the probability of erroneous detection caused by repeated transmission of control signaling is also avoided.

18 Claims, 7 Drawing Sheets

(51) Int. Cl.
  *H04W 76/27* (2018.01)
  *H04W 72/04* (2009.01)
(52) U.S. Cl.
  CPC ... *H04W 72/0493* (2013.01); *H04W 72/1263* (2013.01); *H04W 72/1289* (2013.01); *H04W 76/27* (2018.02)
(58) Field of Classification Search
  CPC .......... H04W 72/1263; H04W 72/1289; H04L 5/0007; H04L 5/0073; H04L 27/2601; H04L 41/0803; H04L 5/0035; H04L 5/0053; H04B 7/0456; H04B 7/0695; H04B 7/0408; H04B 7/088; H04B 17/318; H04B 17/336; H04B 1/713; H04B 7/06; H04J 11/00; H04J 2011/0096; H04M 15/66
  See application file for complete search history.

(56) References Cited

U.S. PATENT DOCUMENTS

| | | | |
|---|---|---|---|
| 2008/0233966 | A1 | 9/2008 | Scheim et al. |
| 2009/0135766 | A1 | 5/2009 | Vitebsky |
| 2009/0257421 | A1* | 10/2009 | Nakashima ....... H04W 74/0833 370/345 |
| 2009/0274086 | A1* | 11/2009 | Petrovic ............... H04W 48/10 370/312 |
| 2010/0142467 | A1* | 6/2010 | Tiirola ................. H04L 5/0094 370/329 |
| 2010/0202420 | A1 | 8/2010 | Jersenius |
| 2011/0280226 | A1 | 11/2011 | Lennvall |
| 2012/0314588 | A1* | 12/2012 | Nammi ................ H04L 1/0027 370/252 |
| 2013/0077606 | A1* | 3/2013 | Wu .................... H04W 72/1263 370/336 |
| 2013/0235727 | A1 | 9/2013 | Campbell |
| 2013/0242890 | A1* | 9/2013 | He ....................... H04L 1/1812 370/329 |
| 2014/0126531 | A1* | 5/2014 | Kang ................... H04L 5/0007 370/330 |
| 2014/0313908 | A1* | 10/2014 | da Silva .............. H04W 72/042 370/252 |
| 2015/0173099 | A1 | 6/2015 | Sun |
| 2015/0181609 | A1 | 6/2015 | Nusairat et al. |
| 2015/0373731 | A1 | 12/2015 | Quan et al. |
| 2016/0021642 | A1* | 1/2016 | Kim ..................... H04L 5/0039 370/329 |
| 2016/0150541 | A1 | 5/2016 | Park et al. |
| 2016/0183262 | A1 | 6/2016 | Fan et al. |
| 2016/0254889 | A1 | 9/2016 | Shattil |
| 2016/0277954 | A1 | 9/2016 | Frenne et al. |
| 2016/0295525 | A1 | 10/2016 | Zhu et al. |
| 2016/0366696 | A1 | 12/2016 | Hlander et al. |
| 2017/0290048 | A1 | 10/2017 | Amuru et al. |
| 2018/0167115 | A1* | 6/2018 | Zhu ........................ H04B 7/065 |
| 2020/0128571 | A1* | 4/2020 | Tang ................ H04W 72/0493 |

FOREIGN PATENT DOCUMENTS

| | | |
|---|---|---|
| CN | 102301772 A | 12/2011 |
| CN | 103313417 A | 9/2013 |
| CN | 104349464 A | 2/2015 |
| CN | 105792365 A | 7/2016 |
| CN | 106304350 A | 1/2017 |
| CN | 106559841 A | 4/2017 |
| CN | 107124767 A | 9/2017 |
| EP | 2958356 A1 | 12/2015 |
| RU | 2447614 C2 | 4/2012 |
| TW | 201642702 A | 12/2016 |
| WO | 2017116108 A1 | 7/2017 |
| WO | 2017133378 A1 | 8/2017 |

OTHER PUBLICATIONS

International Search Report in the international application No. PCT/CN2017/101786, dated Jun. 4, 2018.
CMCC, "Discussion on Signalling and UE behavior for DL and UL transmission assignment", 3GPP TSG RAN WG1 Meeting #90, R1-1713846, issued on Aug. 12, 2017. section 1-3.
Samsung, "DL/UL Resource Allocation", 3GPP TSG RAN WG1 Meeting NR#3, R1-1716004, issued on Sep. 12, 2017. section 3.
First Office Action of the Chinese application No. 201911323531.3, dated Nov. 2, 2020.
First Office Action of the European application No. 18855275.6, dated Jan. 15, 2021.
Notice of Allowance of the Russian application No. 2020101949, dated Dec. 8, 2020.
MCC Support; "Final Report of 3GPP TSG RAN WG1 #90 v1.0.0 (Prague, Czech Rep, Aug. 21-25, 2017)", 3GPP TSG RAN WG1 Meeting #90bis, RI-1716941, Prague, Czech Rep, Oct. 9-13, 2017.
Notice of Allowance of the U.S. Appl. No. 16/724,099, dated Jun. 26, 2020.
Initiated Interview Summary of the U.S. Appl. No. 16/724,099, dated Jun. 26, 2020.
Corrected Notice of Allowance of the U.S. Appl. No. 16/724,099, dated Aug. 12, 2020.
First Office Action of the Chilean application No. 202000016, dated Mar. 16, 2021.
First Office Action of the Canadian application No. 3066927, dated Feb. 17, 2021.
First Office Action of the Indian application No. 202017000565, dated May 8, 2021.
English translation of the Written Opinion of the International Search Authority in the international application No. PCT/CN2017/101786, dated Jun. 4, 2018.
English translation of the Written Opinion of the International Search Authority in the international application No. PCT/CN2018/103458, dated Dec. 5, 2018.
Supplementary European Search Report in the European application No. 18855275.6, dated May 6, 2020.
Supplementary European Search Report in the European application No. 17925003.0, dated Apr. 1, 2020.
First Office Action of the U.S. Appl. No. 16/724,099, dated Mar. 13, 2020.
CATT, PDSCH and PUSCH resource allocation [online], 3GPP TSG RAN WG1 adhoc_NR_AH_1709 R1-1715824, Sep. 12, 2017, [Search date: Sep. 15, 2021], <URL: https://www.3gpp.org/ftp/tsg_ran/WG1_RL1/TSGR1_AH/NR_AH_1709/Docs/R1-1715824.zip>, section 3.2.2. 11 pages.
First Office Action ot the Japanese application No. 2020-500602, dated Sep. 28, 2021. 8 pages with English translation.
First Office Action of the Taiwanese application No. 107132553, dated Oct. 29, 2021. 12 pages with English translation.
Guangdong Oppo Mobile Telecom: "Resource allocation for PDSCH/PUSCH", 3GPP Draft: R1-1715690. 3rd Generation Partnership Project (3GPP), Mobilecompetence Centre; 650, Route Des Lucioles;

(56) References Cited

OTHER PUBLICATIONS

F-06921 Sophia-Antipolis Cedex; France, vol. Ran WG1, No. Nagoya, Japan; Sep. 18 2017-Sep. 21, 2017 Sep. 11, 2017 (Sep. 11, 2017), XP051329142 Retrieved from the Internet: URL: http://www.3gpp.org/ftp/tsg_ran/WG1 RL1/TSGR1 AH/NR AH 1709/Docs/[ retrieved on Sep. 11, 2017 ]* tables 3, 4  figures 1,2, 3 sections 1 -4*.

LG Electronics: "Discussion on resource allocation and TBS determination" 3GPP Draft R1-1715885 Discussion On Resource Allocation and TBS Determination VF, 3rd Generation Partnership Project (3GPP), Mobile Competence Centre 650, Route Des Lucioles; F-06921 Sophia-Antipolis, vol. Ran WG1, No. Nagoya, Japan; Sep. 18, 2017-Sep. 21, 2017 Sep. 12, 2017 (Sep. 12, 2017), XP051329569 Retrieved from the Internet: URL: http://www.3gpp.org/ftp/tsg-ran/WG1_RL1/TSGRI AH/NR AH 1709/Docs/[ retrieved on Sep. 12, 2017] sections 3-5 *.

CATT: "NR DL/UL time domain resource allocation", 3GPP Draft; R1-1712411,3RD Generation Partnership Project (3GPP), Mobile Competence Centre; 650, Route Des Lucioles; F-06921 Sophia-Antipolis Cedex France, vol. Ran WG1, No. Prague, Czechia; Aug. 21, 2017-Aug. 25, 2017 Aug. 20, 2017 (Aug. 20, 2017), XP051315227 Retrieved from the Internet: URL: http://www.3gpp.org/ftp/Meetings 3GPP SYNC/RAN1/Docs/[ retrieved on Aug. 20, 2017]* figures 1-4 ** sections 2-3 *.

First Office Action of the Korean application No. 10-2020-7000754, dated Feb. 24, 2022. 8 pages with English translation.

Supplementary European Search Report of the European application No. 21210500.1, dated Mar. 22, 2022. 15 pages.

* cited by examiner

METHOD AND DEVICE FOR DETERMINING TIME-DOMAIN RESOURCES, STORAGE MEDIUM, AND SYSTEM

CROSS-REFERENCE TO RELATED APPLICATIONS

This application is the US National Stage of PCT Application No. PCT/CN2018/103458, filed Aug. 31, 2018, which claims priority to PCT Application No. PCT/CN2017/101786, filed on Sep. 14, 2017, and named after "METHOD AND DEVICE FOR DETERMINING TIME-DOMAIN RESOURCES, STORAGE MEDIUM, AND SYSTEM", the contents of which are hereby incorporated by reference in its entirety.

TECHNICAL FIELD

The disclosure relates to the technical field of wireless communications, and more particularly to a method and device for determining a time-domain resource, a storage medium and a system.

BACKGROUND

With the development of communication technologies, researches on 5th generation mobile networks (5G) have been made. Radio access of 5G is called new radio (NR). Since 5G is required to support ultrahigh data transmission rate, massive data connections and relatively low data transmission delay, a 5G NR system, compared with long term evolution (LTE) system, may not only implement resource scheduling and allocation in units of a slot, like the LTE system, but also implement resource scheduling and allocation in units of a symbol in a slot to improve resource allocation flexibility and reduce the data transmission delay. The resource scheduling and allocation in units of a symbol may be called symbol-level resource scheduling and allocation.

In the 5G NR system, a 5G base station, i.e., a gNB, may perform symbol-level scheduling on a time-domain resource for transmitting a channel, and may also dynamically or semi-persistently perform symbol-level configuration on the time-domain resource. Therefore, a conflict between time-domain resource scheduling information and time-domain resource configuration information of the gNB may cause the condition that a terminal may not transmit a channel within a short period of time.

SUMMARY

For solving the technical problem, embodiments of the disclosure are intended to provide a method and device for determining a time-domain resource, a storage medium, and a system, which may avoid the condition that a terminal may not transmit a channel in a short period of time due to a conflict between scheduling information and configuration information.

The technical solutions of the embodiments of the disclosure are implemented as follows.

According to a first aspect, the embodiments of the disclosure provide a method for determining a time-domain resource, which is applied to a terminal and includes the following operations.

Allocation information for scheduling a time-domain resource is received from a network device.

The time-domain resource to be scheduled includes a time-domain resource required for channel transmission.

According to a preset rule, a time-domain position corresponding to the time-domain resource to be scheduled is determined based on uplink (UL) and downlink (DL) time-domain resource configuration information and the allocation information.

Channel transmission is performed through the time-domain resource to be scheduled based on the time-domain position corresponding to the time-domain resource to be scheduled.

According to a second aspect, the embodiments of the disclosure provide a method for determining a time-domain resource, which is applied to a network device and includes the following operations.

Allocation information for scheduling a time-domain resource is sent to a terminal. The time-domain resource to be scheduled includes a time-domain resource required for channel transmission and the allocation information is used for the terminal to determine a time-domain position corresponding to the time-domain resource to be scheduled.

Channel transmission is performed through the time-domain resource to be scheduled based on the time-domain position corresponding to the time-domain resource to be scheduled.

According to a third aspect, the embodiments of the disclosure provide a terminal, which includes a receiving portion, a determination portion and a first transmission portion.

The receiving portion is configured to receive allocation information for scheduling a time-domain resource from a network device. The time-domain resource to be scheduled includes a time-domain resource required for channel transmission.

The determination portion is configured to determine, according to a preset rule, a time-domain position corresponding to the time-domain resource to be scheduled based on UL and DL time-domain resource configuration information and the allocation information.

The first transmission portion is configured to perform channel transmission through the time-domain resource to be scheduled based on the time-domain position corresponding to the time-domain resource to be scheduled.

According to a fourth aspect, the embodiments of the disclosure provide a network device, which includes a sending portion and a second transmission portion.

The sending portion is configured to send allocation information for scheduling a time-domain resource to a terminal. The time-domain resource to be scheduled includes a time-domain resource required for channel transmission and the allocation information is used for the terminal to determine a time-domain position corresponding to the time-domain resource to be scheduled.

The second transmission portion is configured to perform channel transmission through the time-domain resource to be scheduled based on the time-domain position corresponding to the time-domain resource to be scheduled.

According to a fifth aspect, the embodiments of the disclosure provide a computer-readable medium having stored thereon a program for determining a time-domain resource that, when executed by at least one processor, implements the method in the first aspect.

According to a sixth aspect, the embodiments of the disclosure provide a computer-readable medium having stored thereon a program for determining a time-domain resource that, when executed by at least one processor, implements the method in the second aspect.

According to a seventh aspect, the embodiments of the disclosure provide a terminal, which includes a first network interface, a first memory and a first processor.

The first network interface is configured to receive and send a signal during receiving and sending information with an external network element.

The first memory is configured to store a computer program capable of running in the first processor.

The first processor is configured to run the computer program to execute the method in the first aspect.

According to an eighth aspect, the embodiments of the disclosure provide a network device, which includes a second network interface, a second memory and a second processor.

The second network interface is configured to receive and send a signal during receiving and sending information with an external network element.

The second memory is configured to store a computer program capable of running in the second processor.

The second processor is configured to run the computer program to execute the method in the second aspect.

According to a ninth aspect, the embodiments of the disclosure provide a system for determining a time-domain resource, which includes a terminal and a network device.

The network device is configured to send allocation information for scheduling a time-domain resource to the terminal; here, the time-domain resource to be scheduled includes a time-domain resource required for channel transmission and the allocation information is used for the terminal to determine a time-domain position corresponding to the time-domain resource to be scheduled, and perform channel transmission through the time-domain resource to be scheduled based on the time-domain position corresponding to the time-domain resource to be scheduled.

The terminal is configured to receive the allocation information for scheduling the time-domain resource from the network device; here, the time-domain resource to be scheduled includes the time-domain resource required for channel transmission, determine, according to a preset rule, the time-domain position corresponding to the time-domain resource to be scheduled based on UL and DL time-domain resource configuration information and the allocation information, and perform channel transmission through the time-domain resource to be scheduled based on the time-domain position corresponding to the time-domain resource to be scheduled.

The embodiments of the disclosure provide a method and device for determining a time-domain resource, a storage medium and a system. The terminal determines the time-domain position corresponding to the time-domain resource to be scheduled according to the rule predetermined with a base station to make the determined time-domain position is consistent with scheduling information obtained after the base station adjusts the time-domain resource to be scheduled, so that the condition that the terminal may not transmit a channel within a short period of time due to a conflict between the time-domain resource configuration information and the time-domain resource scheduling information during channel transmission of the terminal is avoided, a signaling overhead during channel transmission of the terminal and the base station is also reduced, and an increase in the probability of false detection caused by repeated sending of control signaling is also avoided.

DETAILED DESCRIPTION

In order to make the characteristics and technical contents of the embodiments of the disclosure understood in more detail, the embodiments of the disclosure will be described below in combination with the drawings in detail. The drawings are only adopted for description as references and not intended to limit the embodiments of the disclosure.

Figure 1:
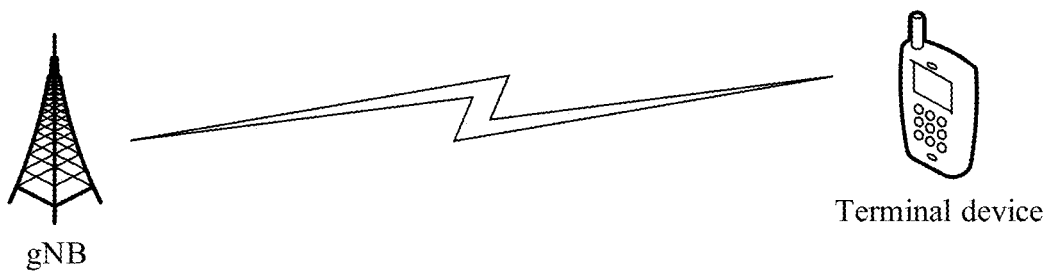
FIG. 1 illustrates a schematic diagram of an application scenario according to an embodiment of the disclosure.

Referring to FIG. 1, an atypical application scenario according to an embodiment of the disclosure is illustrated. The scenario may include a network device and a terminal device. The network device may be an evolved node B (eNB) in an LTE system, may also be a gNB in a 5G NR system and, of course, may also be another network device capable of providing a function of accessing a mobile communication network for the terminal device. The terminal device may include a cell phone, a smart phone, a session initiation protocol (SIP) phone, a laptop computer, a personal digital assistant (PDA), a satellite ratio telephone, a global positioning system, a multimedia device, a video device, a digital audio player (for example, a moving picture experts group audio layer-3 (MP3) player), a camera, a game console, a tablet or any other device with a similar function. In addition, the terminal device may also be called, by those skilled in the art, user equipment, a terminal, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client or some other proper terms.

In the application scenario illustrated in FIG. 1, during multi-slot or slot aggregation scheduling, a base station may configure a starting symbol and a terminating symbol for channel transmission in each of multiple slots, thereby implementing symbol-level configuration. In addition, the base station may also perform symbol-level scheduling for the slots for channel transmission. In embodiments of the disclosure, a channel to be transmitted may include a data channel such as a physical downlink shared channel (PDSCH) and a physical uplink shared channel (PUSCH), and may also include a control channel such as a physical downlink control channel (PDCCH) and a physical uplink control channel (PUCCH). For describing the technical solutions of the embodiments of the disclosure clearly, descriptions are made preferably with a DL data channel such as a PDSCH as an example in the embodiments of the disclosure. It is to be understood that those skilled in the art may apply the technical solutions of the embodiments of the disclosure to channels of other types under the guidance of the DL data channel.

A conflict between symbol-level scheduling and symbol-level configuration of a time-domain resource such as a slot may make it impossible for a terminal to transmit a channel within a short period of time. A specific conflict conditions may at least include the following two examples.

First Example

Figure 2:
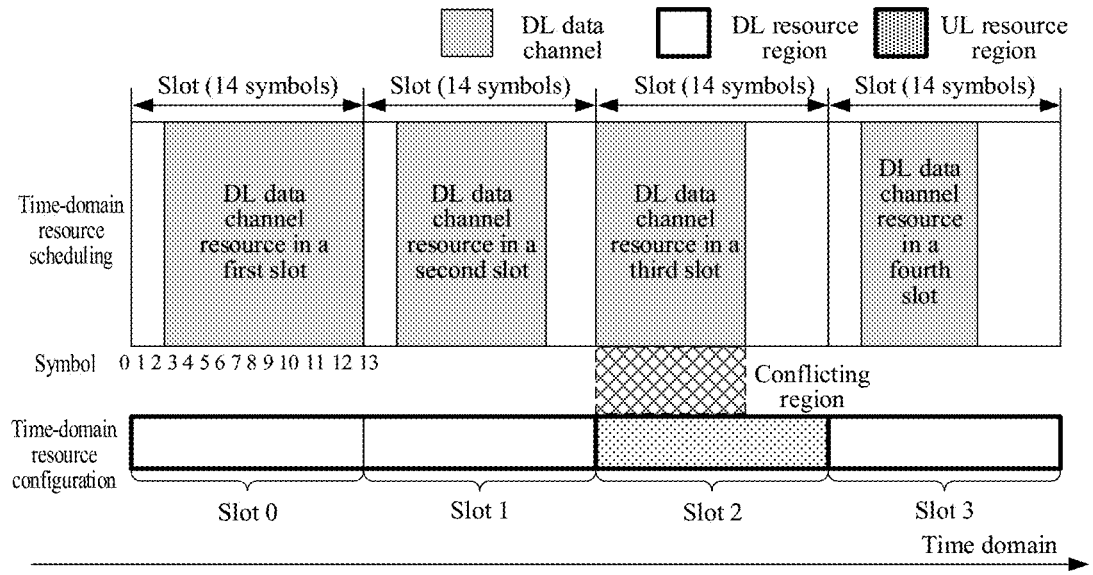
FIG. 2 illustrates a schematic diagram of a conflict according to an embodiment of the disclosure.

As illustrated in FIG. 2, for example, a channel to be transmitted is a DL data channel such as a PDSCH. A gNB schedules part of symbol resources in each of four slots, i.e., a slot 0, a slot 1, a slot 2 and a slot 3, to transmit the DL data channel. Each slot has a length of 14 symbols, but not all symbols in each of the four slots are required to be occupied when the four slots are scheduled to transmit the PDSCH. On the other hand, the gNB, when perform time-domain resource symbol-level configuration for a terminal, configures all the symbols in the slot 2 for transmission of a UL channel, as illustrated in dotted blocks in FIG. 2. In such a case, scheduled resources in the slot 2 may wholly conflict with configured resources in the slot 2, like a conflict region filled with cross lines in FIG. 2.

Second Example

Figure 3:
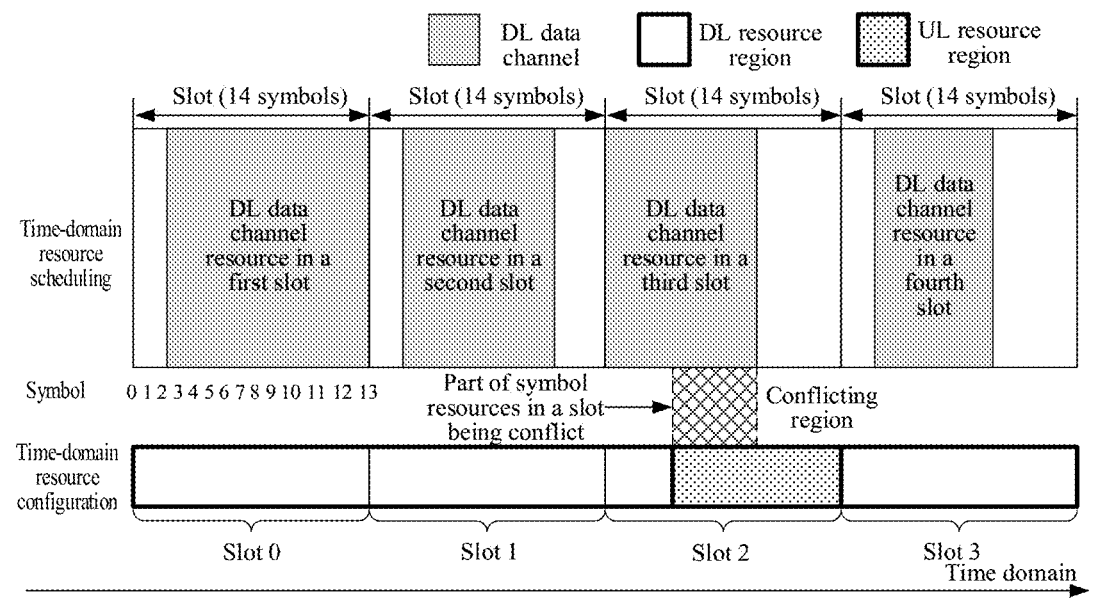
FIG. 3 illustrates a schematic diagram of another conflict according to an embodiment of the disclosure.

As illustrated in FIG. 3, for example, a channel to be transmitted is a DL data channel such as a PDSCH. A gNB schedules part of symbol resources in each of four slots, i.e., a slot 0, a slot 1, a slot 2 and a slot 3, for transmission. Each slot has a length of 14 symbols, but not all symbols in each of the four slots are required to be occupied when the four slots are scheduled to transmit the PDSCH. On the other hand, the gNB, when perform time-domain resource symbol-level configuration for a terminal, configures part of symbols in the slot 2 for transmission of a UL channel, as illustrated in dotted blocks in FIG. 3. In such a case, part of symbols of scheduled resources in the slot 2 may conflict with configured resources in the slot 2, like a conflict region filled with cross lines in FIG. 3.

The specific conflict condition is not limited to the two examples. It is to be pointed out that a base station confronted with the above-described conflicts, for solving the conflicts, may adjust a time-domain resource to be scheduled during time-domain resource scheduling to avoid the conflicts. However, the base station, after adjusting the time-domain resource to be scheduled, is required to notify a terminal of a scheduling state of the adjusted time-domain resource, which may bring a high signaling overhead. Moreover, when the base station is required to notify, through control signaling, the terminal of adjustment of time-domain resource scheduling for many times, a false detection probability of the terminal for the control signaling may also be increased. According to the technical solutions of the embodiments of the disclosure, after the base station adjusts the time-domain resource to be scheduled, the signaling overhead in notifying the terminal may be reduced, and detection reliability of the control signaling may be improved.

Embodiment 1

Figure 4:
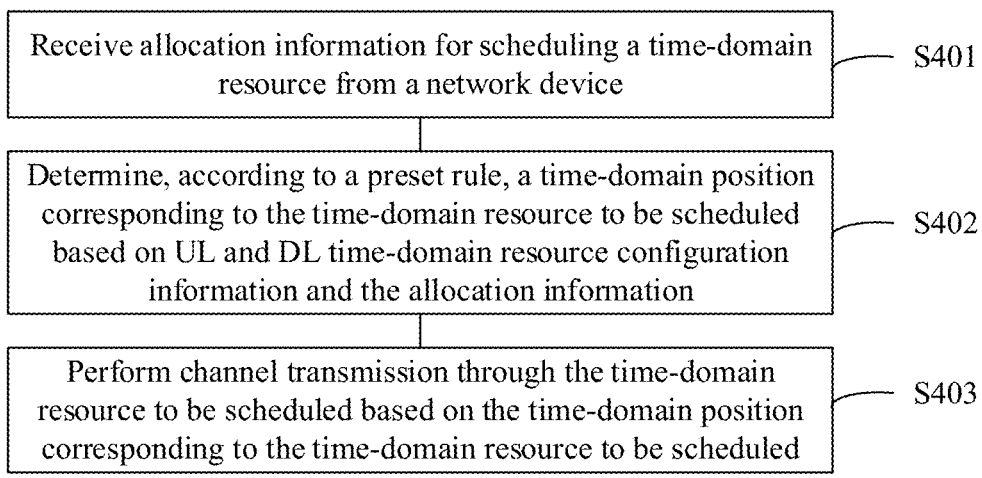
FIG. 4 illustrates a flowchart of a method for determining a time-domain resource according to an embodiment of the disclosure.

Referring to FIG. 4, a method for determining a time-domain resource provided in the embodiment of the disclosure is illustrated. The method may be applied to a terminal. The method may include the following operations.

At block S401, allocation information for scheduling a time-domain resource is received from a network device. The time-domain resource to be scheduled includes a time-domain resource required for channel transmission.

At block S402, a time-domain position corresponding to the time-domain resource to be scheduled is determined according to a preset rule, based on UL and DL time-domain resource configuration information and the allocation information.

At block S403, channel transmission is performed through the time-domain resource to be scheduled based on the time-domain position corresponding to the time-domain resource to be scheduled.

It is to be explained that a channel may include a data channel such as a PDSCH and a PUSCH, and may also include a control channel such as a PDCCH and a PUCCH.

It can be understood that the preset rule may be a rule predetermined by negotiation between the terminal and the network device such as a gNB. The gNB, in case of a conflict between scheduling of a time-domain resource and configuration of the time-domain resource, may adjust the time-domain resource to avoid the conflict. A specific manner or means in which the gNB adjusts the time-domain resource to be scheduled may be described through the rule. Therefore, the terminal, after obtaining the preset rule, may make the same adjustment like the gNB. Thus, the gNB, after adjusting a scheduling of the time-domain resource, is not required to notify the terminal, and a signaling overhead between the terminal and the gNB is reduced.

For the technical solution illustrated in FIG. 4, in a possible implementation, the allocation information for scheduling the time-domain resource may be carried in downlink control information (DCI). It can be understood that the DCI may be dynamically configured such that the gNB may timely transport the allocation information to the terminal and the terminal may timely determine the position of the time-domain resource to be scheduled to avoid occurrence of the conflict.

For the technical solution illustrated in FIG. 4, in a possible implementation, the method may further include that: the UL and DL time-domain resource configuration information is received from the network device. The UL and DL time-domain resource configuration information includes at least one of slot-level position information or symbol-level position information of an available time-domain resource. It is to be explained that information used to characterize the position of the time-domain resource in units of a slot is called the time-level position information of the time-domain resource and information used to characterize the position of the time-domain resource in units of a symbol is called the symbol-level position information of the time-domain resource.

Specifically, the UL and DL time-domain resource configuration information may be predefined information. The UL and DL time-domain resource configuration information may also be carried in at least one of radio resource control (RRC) signaling or the DCI. During a specific implementation, the UL and DL time-domain resource configuration information may be at least one of frame structure information (SFI) or a slot format indicator (SFI).

For the technical solution illustrated in FIG. 4, the allocation information for scheduling the time-domain resource is not scheduling information obtained after the gNB adjusts the time-domain resource to be scheduled but description information of the time-domain resource to be scheduled. The terminal, after obtaining the description information of the time-domain resource to be scheduled, determines the time-domain position corresponding to the time-domain resource to be scheduled according to the obtained rule determined by negotiation with the gNB, so that the time-domain position, finally determined by the terminal, corresponding to the time-domain resource to be scheduled is consistent with the scheduling information obtained after the gNB adjusts the time-domain resource to be scheduled. Therefore, the gNB is not required to notify the terminal of the scheduling information obtained after the time-domain resource to be scheduled is adjusted in a channel transmission process, the signaling overhead between the gNB and the terminal in the channel transmission process is reduced, and an increase in the probability of false detection caused by repeated sending of control signaling is also avoided.

Therefore, in the embodiment, the allocation information for scheduling the time-domain resource atypically includes the two conditions for the description information of the time-domain resource to be scheduled.

First Condition

The allocation information for scheduling the time-domain resource includes information about a number of time-domain resources to be scheduled. Specifically, the information about the number of the time-domain resources to be scheduled includes at least one of slot-level number information for the time-domain resources to be scheduled or symbol-level number information for the time-domain resources to be scheduled. It is to be explained that information used to represent the number of the time-domain resources in units of a slot is called the slot-level number information of the time-domain resources and information used to represent the number of the time-domain resources in units of a symbol is called the symbol-level number information of the time-domain resource.

Figure 5:
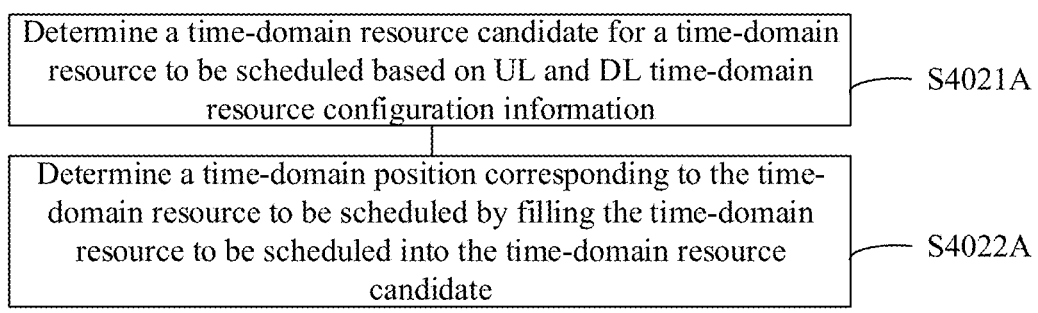
FIG. 5 illustrates a flowchart of determining a time-domain position of a time-domain resource to be scheduled according to an embodiment of the disclosure.

Correspondingly, when the allocation information for scheduling the time-domain resource includes the information about the number of the time-domain resources to be scheduled, referring to FIG. 5, the operation in S402 that the time-domain position corresponding to the time-domain resource to be scheduled is determined according to the preset rule based on the UL and DL time-domain resource configuration information and the allocation information may include the following operations.

At block S4021A, time-domain resource candidates are determined for time-domain resources to be scheduled based on the UL and DL time-domain resource configuration information.

The number of the time-domain resource candidates is the same as the number of the time-domain resources to be scheduled, and there is no conflict between the time-domain resource candidates and the UL and DL time-domain resource configuration information. The conflict represents that a transmission direction indicated by the UL and DL time-domain resource configuration information is opposite to a channel transmission direction of the time-domain resources to be scheduled.

At block S4022A, time-domain positions corresponding to the time-domain resources to be scheduled are determined by filling the time-domain resources to be scheduled into the time-domain resource candidates.

In this example, in an implementation process, the operation of filling the time-domain resources into the time-domain resource candidates may preferably include that: the time-domain resources to be scheduled are sequentially filled into the time-domain resource candidates.

It is to be noted that the terminal, after obtaining the information about the number of the time-domain resources to be scheduled, may determine the time-domain resource candidates not conflicting with the UL and DL time-domain resource configuration information and then sequentially fill the time-domain resources to be scheduled into the time-domain resource candidates. It can be understood that, since the information about the number of the time-domain resources to be scheduled may be at least one of the slot-level number information or the symbol-level number information, the terminal, when determining the time-domain resource candidates, may also determine the time-domain resource candidates in at least one of a slot-level or symbol-level manner. The time-domain position corresponding to the time-domain resource to be scheduled, determined by the terminal according to the abovementioned process, is consistent with the scheduling information obtained after the gNB adjusts the time-domain resource to be scheduled, so that no signaling interaction is required to notify the terminal of the adjusted scheduling information during channel transmission, the signaling overhead between the gNB and the terminal is reduced, and false detection probability increase caused by repeated sending of the control signaling is also avoided.

Second Condition

The allocation information for scheduling the time-domain resource includes the information about the number of time-domain resources to be scheduled and preselected position information for each time-domain resource to be scheduled. It can be understood that the number information may be at least one of slot-level or symbol-level number information and the position information may be at least one of slot-level or symbol-level position information and elaborations are omitted herein.

Figure 6:
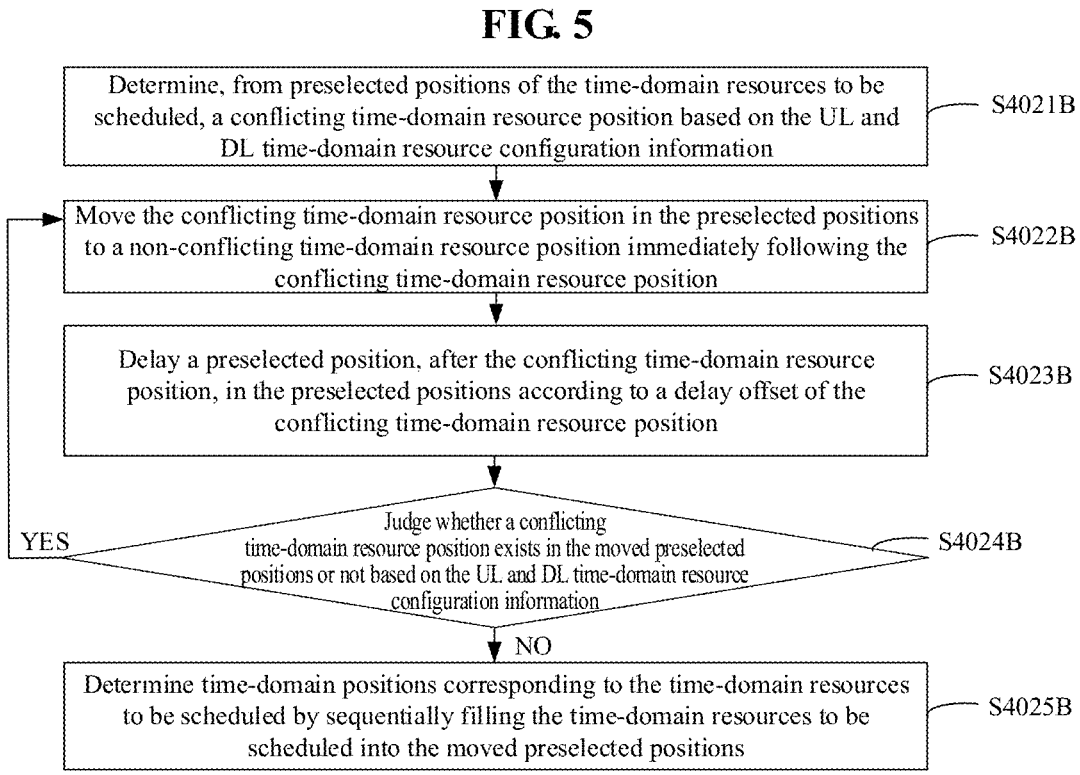
FIG. 6 illustrates another flowchart of determining a time-domain position of a time-domain resource to be scheduled according to an embodiment of the disclosure.

Correspondingly, when the allocation information for scheduling the time-domain resource includes the information about the number of the time-domain resources to be scheduled and preselected position information for the time-domain resources to be scheduled, referring to FIG. 6, the operation in S402 that the time-domain position corresponding to the time-domain resource to be scheduled is determined according to the preset rule based on the UL and DL time-domain resource configuration information and the allocation information may include the following operations.

At block S4021B, a conflicting time-domain resource position is determined, from preselected positions of time-domain resources to be scheduled, based on the UL and DL time-domain resource configuration information. The conflicting time-domain resource position is a time-domain resource position, in the UL and DL time-domain resource configuration information, with a channel transmission direction opposite to a channel transmission direction of the time-domain resources to be scheduled.

At block S4022B, the conflicting time-domain resource position in the preselected positions is moved to a non-conflicting time-domain resource position immediately following the conflicting time-domain resource position. It can be understood that the non-conflicting time-domain resource position is a time-domain resource position in the UL and DL time-domain resource configuration information, with a channel transmission direction the same as a channel transmission direction of the time-domain resources to be scheduled.

At block S4023B, a preselected position, after the conflicting time-domain resource position, in the preselected positions is delayed according to a delay offset of the conflicting time-domain resource position.

At block S4024B, whether a conflicting time-domain resource position exists in the moved preselected positions or not is judged according to the UL and DL time-domain resource configuration information, if YES, S4022B is executed until no conflicting time-domain resource position exists in the moved preselected positions that are moved back and S4025B is executed, otherwise S4025B is executed.

At block S4025B, time-domain positions corresponding to the time-domain resources to be scheduled are determined by sequentially filling the time-domain resources to be scheduled into the moved preselected positions.

It can be understood that, when a preset position of the time-domain resource to be scheduled in a slot conflicts with the whole slot position in time-domain configuration information, the conflicting preset position may be moved to the non-conflicting slot position immediately following the conflicting slot position and a preset position after the conflicting preset position is delayed according to a delay offset of the conflicting preset position, thereby avoiding occurrence of a conflict.

In addition, since the position information may be the symbol-level position information, when the preset position of the time-domain resource to be scheduled in the slot conflicts with part of the slot positions in the time-domain configuration information, a symbol at a conflicting preset position may be moved according to the abovementioned process, a preset position after the conflicting preset position is delayed according to a delay offset of the conflicting preset position, and other non-conflicting preset positions are not changed.

According to the time-domain resource determination method provided in the embodiment, the terminal determines the time-domain position corresponding to the time-domain resource to be scheduled according to the rule predetermined with a base station to make the determined time-domain position is consistent with scheduling information obtained after the base station adjusts the time-domain resource to be scheduled, so that the condition that the terminal may not transmit a channel within a short period of time due to a conflict between the scheduling information and the time-domain configuration information during channel transmission of the terminal is avoided, a signaling overhead during channel transmission of the terminal and the base station is also reduced, and false detection probability increase caused by repeated sending of control signaling is further avoided.

Embodiment 2

Figure 7:
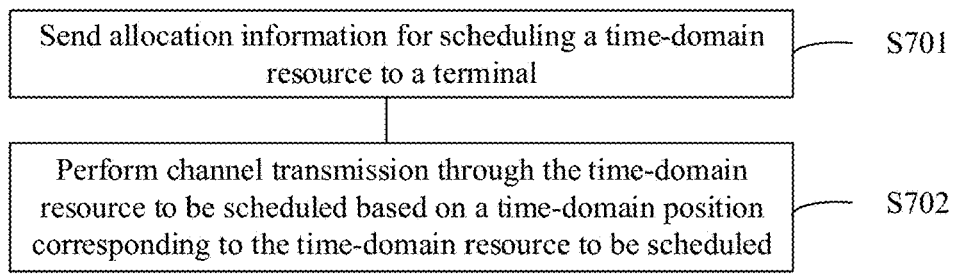
FIG. 7 illustrates a flowchart of another method for determining a time-domain resource according to an embodiment of the disclosure.

Based on the same inventive concept of the abovementioned embodiment, referring to FIG. 7, a flow of a method for determining a time-domain resource provided in the embodiment of the disclosure is illustrated. The method may be applied to a network device, for example, a gNB. The method may include the following operations.

At block S701, allocation information for scheduling a time-domain resource is sent to a terminal.

The time-domain resource to be scheduled includes a time-domain resource required for channel transmission. The allocation information is used for the terminal to determine a time-domain position corresponding to the time-domain resource to be scheduled.

At block 702, channel transmission is performed through the time-domain resource to be scheduled based on the time-domain position corresponding to the time-domain resource to be scheduled.

It is to be explained that the channel may include a data channel such as a PDSCH and a PUSCH, and may also include a control channel such as a PDCCH and a PUCCH.

It can be understood that the gNB, after finding a conflict illustrated in FIG. 2 or FIG. 3 between scheduling information and configuration information of the time-domain resource, may adjust the scheduling information of the time-domain resource to avoid the conflict. The terminal may determine position information of the time-domain resource to be scheduled according to a rule predetermined by negotiation with the gNB and make the same adjustment like the gNB. That is, the time-domain position, determined by the terminal, corresponding to the time-domain resource to be scheduled is consistent with the scheduling information obtained after the gNB adjusts the time-domain resource to be scheduled. Therefore, the gNB may perform channel transmission with the terminal through the time-domain resource to be scheduled based on the time-domain position corresponding to the time-domain resource to be scheduled to avoid the condition that the terminal may not transmit the channel within a short period of time due to the conflict between the scheduling information and the configuration information. Further, the gNB is not required to notify the terminal of the adjustment for the time-domain resource to be scheduled, which can reduce a signaling overhead between the terminal and the gNB and also avoid false detection probability increase caused by repeated sending of control signaling.

In a possible implementation, the allocation information for scheduling the time-domain resource may be carried in DCI. It can be understood that the DCI may be dynamically configured such that the gNB may timely transport the allocation information to the terminal and the terminal may timely determine the position of the time-domain resource to be scheduled to avoid occurrence of the conflict.

In a possible implementation, the method may further include that: UL and DL time-domain resource configuration information is sent to the terminal. The UL and DL time-domain resource configuration information includes at least one of slot-level position information or symbol-level position information of an available time-domain resource. It is to be explained that information configured to represent a position of the time-domain resource in units of a slot is called the slot-level position information of the time-domain resource and information configured to represent a position of the time-domain resource in units of a symbol is called the symbol-level position information of the time-domain resource.

Specifically, the UL and DL time-domain resource configuration information may be predefined information. The UL and DL time-domain resource configuration information may also be carried in at least one of RRC signaling or the DCI. During a specific implementation, the UL and DL time-domain resource configuration information may be at least one of frame structure information or an SFI.

For the technical solution illustrated in FIG. 7, it is to be noted that the allocation information for scheduling the time-domain resource is not scheduling information obtained after the gNB adjusts the time-domain resource to be scheduled but description information of the time-domain resource to be scheduled. The terminal, after obtaining the description information of the time-domain resource to be scheduled, determines the time-domain position corresponding to the time-domain resource to be scheduled according to the obtained rule determined by negotiation with the gNB, so that the time-domain position, finally determined by the terminal, corresponding to the time-domain resource to be scheduled is consistent with the scheduling information obtained after the gNB adjusts the time-domain resource to be scheduled. Therefore, the gNB is not required to notify the terminal of the scheduling information obtained after the time-domain resource to be scheduled is adjusted in a channel transmission process, and the signaling overhead between the gNB and the terminal in the channel transmission process is reduced. As an atypical example, the allocation information for scheduling the time-domain resource includes information about the number of time-domain resources to be scheduled; or, the allocation information for scheduling the time-domain resource includes the information about the number of the time-domain resources to be scheduled and information about a preselected position of each time-domain resource to be scheduled.

According to the time-domain resource determination method provided in the embodiment, the network device sends the allocation information for scheduling the time-domain resource to the terminal to enable the terminal to determine the time-domain position corresponding to the time-domain resource to be scheduled. Therefore, the gNB may perform channel transmission with the terminal through the time-domain resource to be scheduled based on the time-domain position corresponding to the time-domain resource to be scheduled to avoid the condition that the terminal may not transmit the channel within a short period of time due to the conflict between the scheduling information and the configuration information. Further, the gNB is not required to notify the terminal of the adjustment for the time-domain resource to be scheduled, which can reduce a signaling overhead between the terminal and the gNB and also avoid false detection probability increase caused by repeated sending of control signaling.

Embodiment 3

Based on the same inventive concept of the abovementioned embodiments, the technical solutions of the abovementioned embodiments are described in the embodiment with the following specific examples. It is to be noted that, in all the following specific examples, descriptions are made with adoption of a time-domain resource to be scheduled for transmission of a DL data channel such as a PDSCH as an example and a network device is, for example, a gNB. It can be understood that, during a practical application, the time-domain resource to be scheduled may also be configured to transmit a UL data channel such as a PUSCH, and a UL or DL control channel such as a PDCCH or a PUCCH. There are no elaborations made thereto in the specific examples of the embodiment.

Specific Example 1

Figure 8:
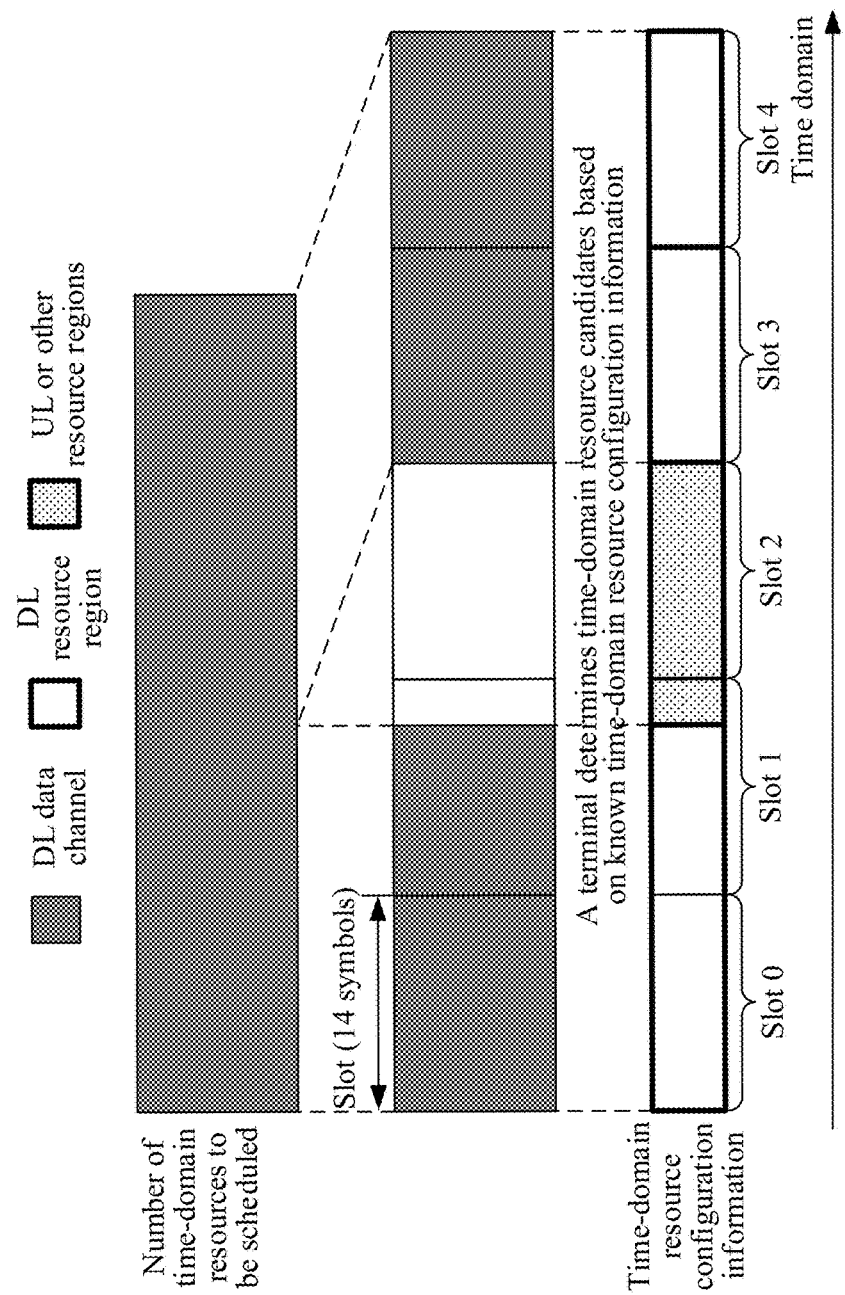
FIG. 8 illustrates a schematic diagram of a specific process of determining a time-domain resource according to an embodiment of the disclosure.

For example, as illustrated in FIG. 8, it is to be noted that the first line in FIG. 8 is graphical information of FIG. 8.

The gNB sends allocation information for scheduling the time-domain resource to a terminal. The allocation information may be a DL grant. The allocation information includes information about the number of time-domain resources to be scheduled, as illustrated in the gray block in the second line in FIG. 8. The information about the number of the time-domain resource to be scheduled may be slot-level information and may also be symbol-level information, so that the total number of the time-domain resources to be scheduled is two slots and a plurality of additional symbols. In the embodiment, the plurality of symbols are, for example, 10 symbols. Therefore, the terminal, after obtaining the information about the number of the resources to be scheduled, determines time-domain resource candidates according to known UL and DL time-domain resource configuration information, as illustrated in the distribution of the gray blocks in the third line in FIG. 8. It is to be noted that the UL and DL time-domain resource configuration information may specifically be DL and UL assignment. It can be seen from the UL and DL time-domain resource configuration information illustrated in the fourth line in FIG. 8 that a plurality of last symbols of a slot 1 and the whole slot 2 are time-domain resource regions configured to transmit a UL channel or others and may conflict with transmission of the PDSCH. Therefore, the terminal, when determining the time-domain resource candidates, may avoid the conflicting regions. Then, the terminal sequentially distributes the time-domain resources to be scheduled into the time-domain resource candidates, thereby determining time-domain positions of the time-domain resources configured to transmit the PDSCH.

Specific Example 2

Figure 9:
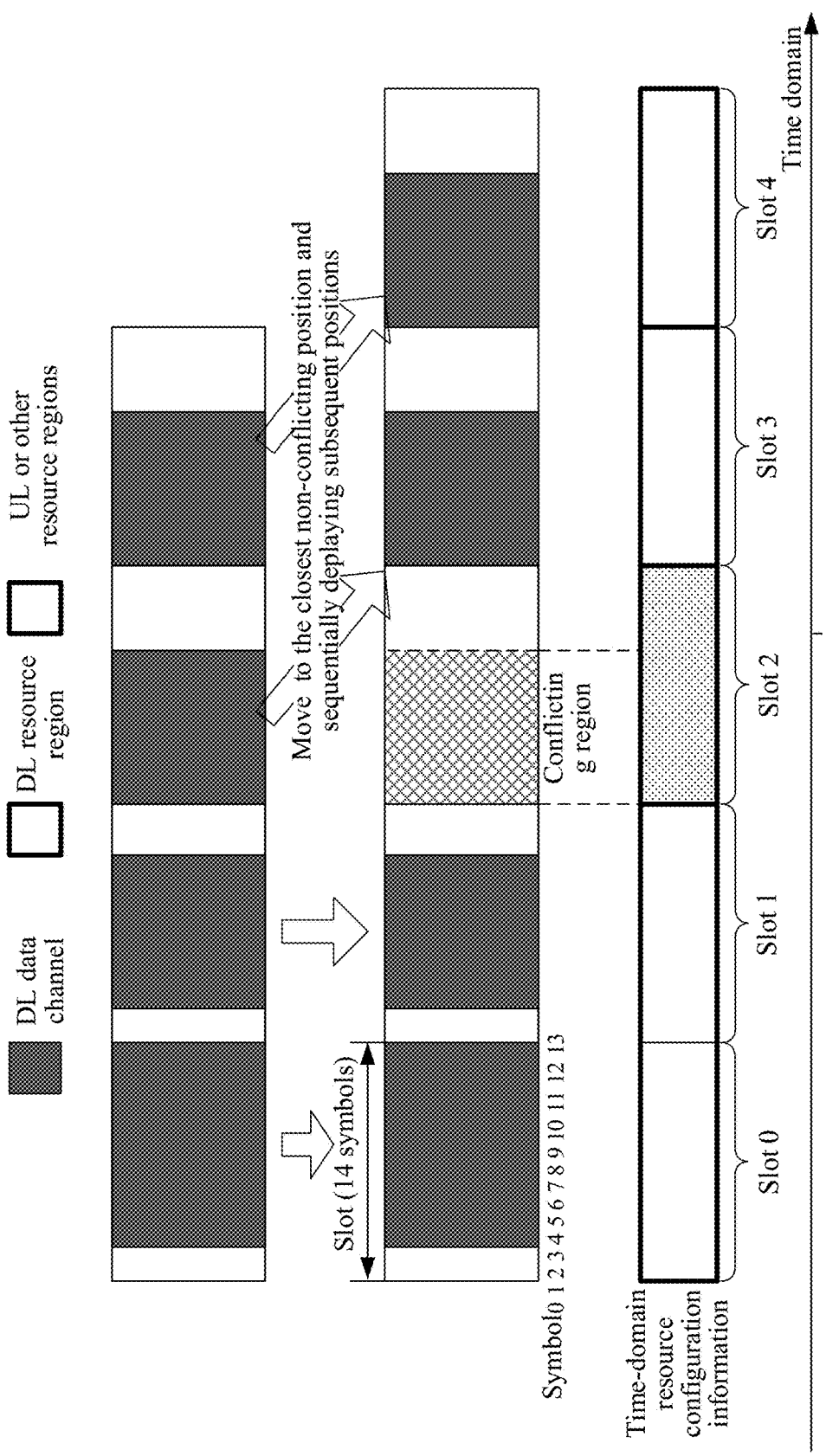
FIG. 9 illustrates a schematic diagram of another specific process of determining a time-domain resource according to an embodiment of the disclosure.

For example, as illustrated in FIG. 9, it is to be noted that the first line in FIG. 9 is graphical information of FIG. 9.

The gNB sends allocation information for scheduling the time-domain resource to a terminal. The allocation information may be a DL grant. The allocation information not only includes information about the number of time-domain resources to be scheduled, but also includes information about a preselected position of each time-domain resource to be scheduled, as illustrated in the second line in FIG. 9. The terminal, after receiving the allocation information, may compare the information about preselected positions of the time-domain resources to be scheduled and known UL and DL time-domain resource configuration information in the fourth line in FIG. 9 to find that a slot 2 is a time-domain resource region configured to transmit the UL channel or others and may conflict with transmission of the PDSCH. Therefore, the terminal moves a conflicting preselected position in the slot 2 to a non-conflicting position, i.e., a slot 3, closest to the slot 2 and delays a preselected position after the conflicting position according to a delay offset of the conflicting preselected position to avoid occurrence of a conflict, as illustrated in the third line in FIG. 9. After the preselected positions are moved, the terminal sequentially fills the time-domain resourced to be scheduled into the moved preselected positions, thereby determining the time-domain positions corresponding to the resources to be scheduled.

Specific Example 3

Figure 10:
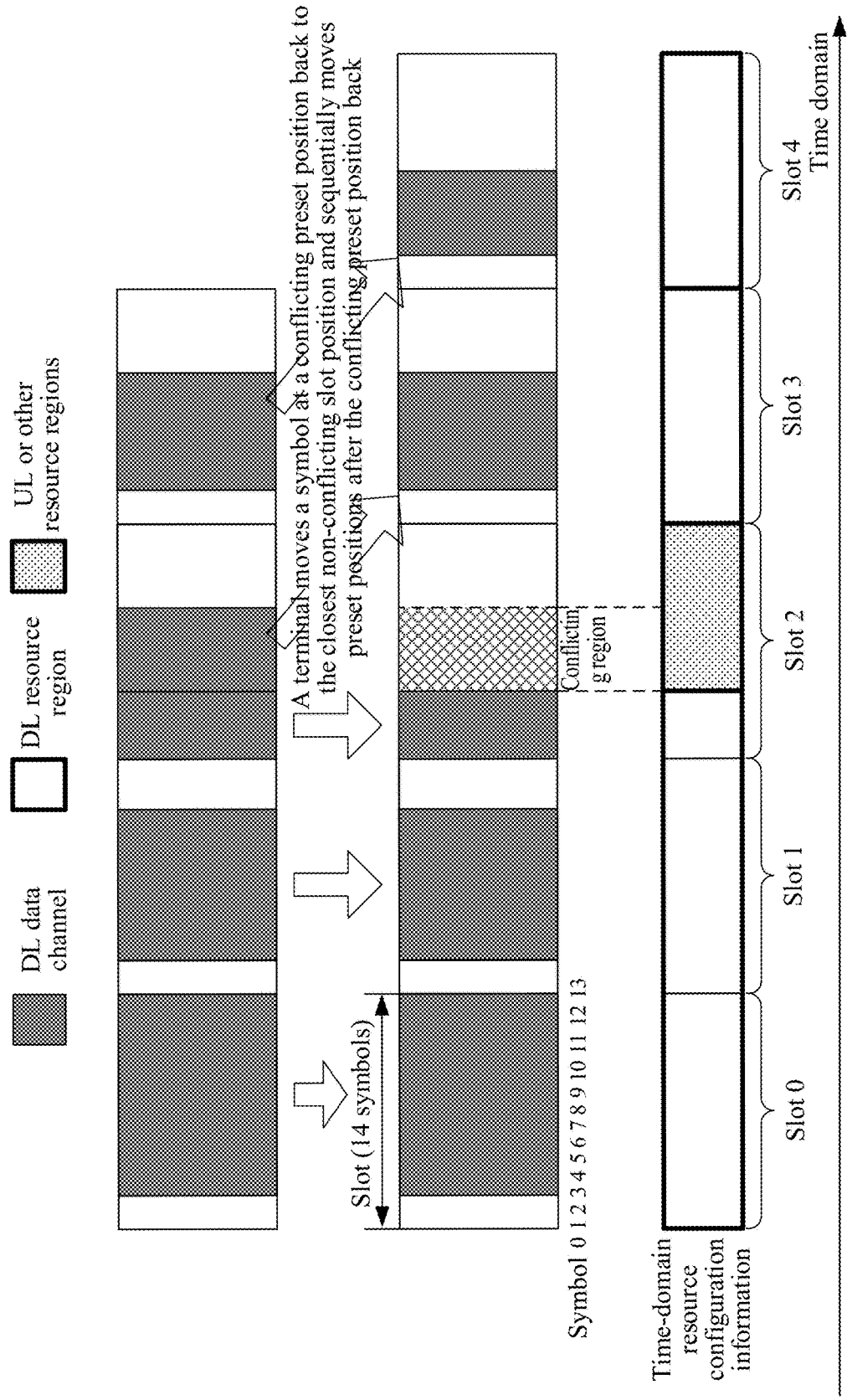
FIG. 10 illustrates a schematic diagram of yet another specific process of determining a time-domain resource according to an embodiment of the disclosure.

For example, as illustrated in FIG. 10, it is to be noted that the first line in FIG. 10 is graphical information of FIG. 10.

Like specific example 2, the gNB sends allocation information for scheduling the time-domain resource to a terminal. The allocation information may be a DL grant. The allocation information not only includes information about the number of time-domain resources to be scheduled, but also includes information about a preselected position of each time-domain resource to be scheduled, as illustrated in the second line in FIG. 10. The terminal, after receiving the allocation information, may compare the information about preselected positions of the time-domain resources to be scheduled and known UL and DL time-domain resource configuration information illustrated in the fourth line in FIG. 10. However, in the specific example, a last part of a slot 2 conflicts with part of preset positions of the time-domain resources to be scheduled, the terminal may move symbols at a conflicting preset position to a closest non-conflicting slot, delay a preset position after the conflicting preset position according to a delay offset of the conflicting preset position and keep other non-conflicting preset positions unchanged to avoid occurrence of a conflict, as illustrated in the third line in FIG. 10. After the preselected positions are moved, the terminal still sequentially fills the time-domain resources to be scheduled into the moved preselected positions according to the process in specific example 2, thereby determining the time-domain position corresponding to the resource to be scheduled.

Specific implementation of the technical solutions of the abovementioned embodiments are described above with the three specific examples in detail. It can be seen that the terminal may determine the time-domain position of the time-domain resource to be scheduled based on the allocation information sent by the gNB, thereby avoiding occurrence of the conflict. Moreover, since a determination result of the terminal is consistent with a result obtained by scheduling adjustment of the gNB, the terminal, during channel transmission with the gNB, is not required to learn an adjustment result of a time-domain resource scheduling of the gNB by signaling interaction, which reduces the signaling overhead and also avoids an increase in the probability of false detection caused by repeated sending of control signaling.

Embodiment 4

Figure 11:
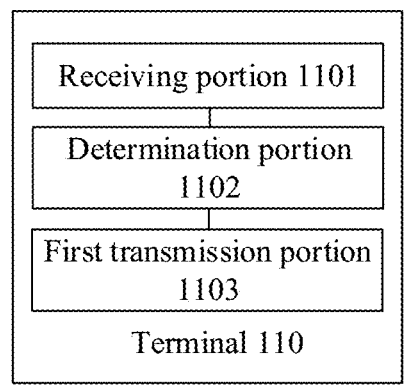
FIG. 11 illustrates a block diagram of a terminal according to an embodiment of the disclosure.

Based on the same inventive concept of the abovementioned embodiments, referring to FIG. 11, a structure of a terminal 110 provided in the embodiment of the disclosure is illustrated, and may include a receiving portion 1101, a determination portion 1102 and a first transmission portion 1103.

The receiving portion 1101 is configured to receive allocation information for scheduling a time-domain resource from a network device. The time-domain resource to be scheduled includes a time-domain resource required for channel transmission.

The determination portion 1102 is configured to determine according to a preset rule, a time-domain position corresponding to the time-domain resource to be scheduled based on UL and DL time-domain resource configuration information and the allocation information.

The first transmission portion 1103 is configured to perform channel transmission through the time-domain resource to be scheduled based on the time-domain position corresponding to the time-domain resource to be scheduled.

In a possible implementation, the allocation information for scheduling the time-domain resource includes information about a number of time-domain resources to be scheduled.

In the implementation, the determination portion 1102 is configured to:

determine time-domain resource candidate for the time-domain resources to be scheduled based on the UL and DL time-domain resource configuration information; the number of the time-domain resource candidates is the same as the number of the time-domain resources to be scheduled, and there is no conflict between the time-domain resource candidates and the UL and DL time-domain resource configuration information, the conflict represents that a transmission direction indicated by the UL and DL time-domain resource configuration information is opposite to a channel transmission direction of the time-domain resources to be scheduled; and determine the time-domain positions corresponding to the time-domain resources to be scheduled by filling the time-domain resources to be scheduled into the time-domain resource candidates.

Specifically, the determination portion 1102 is configured to sequentially fill the time-domain resources to be scheduled into the time-domain resource candidates.

In a possible implementation, the allocation information for scheduling the time-domain resource includes information about the number of the time-domain resources to be scheduled and information about a preselected position of each time-domain resource to be scheduled.

In the implementation, the determination portion 1102 is configured to:

S1: determine, from preselected positions of the time-domain resources to be scheduled, a conflicting time-domain resource position based on the UL and DL time-domain resource configuration information; here, the conflicting time-domain resource position is a time-domain resource position, in the UL and DL time-domain resource configuration information, with a channel transmission direction opposite to a channel transmission direction of the time-domain resources to be scheduled;

S2: move the conflicting time-domain resource position in the preselected positions to a non-conflicting time-domain resource position immediately following the conflicting time-domain resource position;

S3: delay a preselected position, after the conflicting time-domain resource position, in the preselected positions according to a delay offset of the conflicting time-domain resource position;

S4: judge whether a conflicting time-domain resource position exists in the moved preselected positions or not according to the UL and DL time-domain resource configuration information, if YES, turn to S2 until no conflicting time-domain resource position exists in the preselected positions that are moved and execute S5, otherwise execute S5; and S5: determine the time-domain positions corresponding to the time-domain resources to be scheduled by sequentially filling the time-domain resources to be scheduled into the moved the preselected positions.

In a possible implementation, the receiving portion 1101 is further configured to receive the UL and DL time-domain resource configuration information sent by the network device. The UL and DL time-domain resource configuration information includes at least one of slot-level position information or symbol-level position information of an available time-domain resource.

In a possible implementation, a channel includes a data channel or a control channel.

In a possible implementation, the allocation information for scheduling the time-domain resource is carried in DCI.

In a possible implementation, the UL and DL time-domain resource configuration information is predefined information, or, the UL and DL time-domain resource configuration information is carried in at least one of RRC signaling or DCI.

In the implementation, the UL and DL time-domain resource configuration information may be at least one of frame structure information or an SFI.

It can be understood that, in the embodiment, "part" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a read only memory (ROM), a random access memory (RAM), a magnetic disk or an optical disk.

Therefore, the embodiment provides a computer-readable medium, which stores a time-domain resource determination program, the time-domain resource determination program being executed by at least one processor to implement the steps of the method of embodiment 1.

Figure 12:
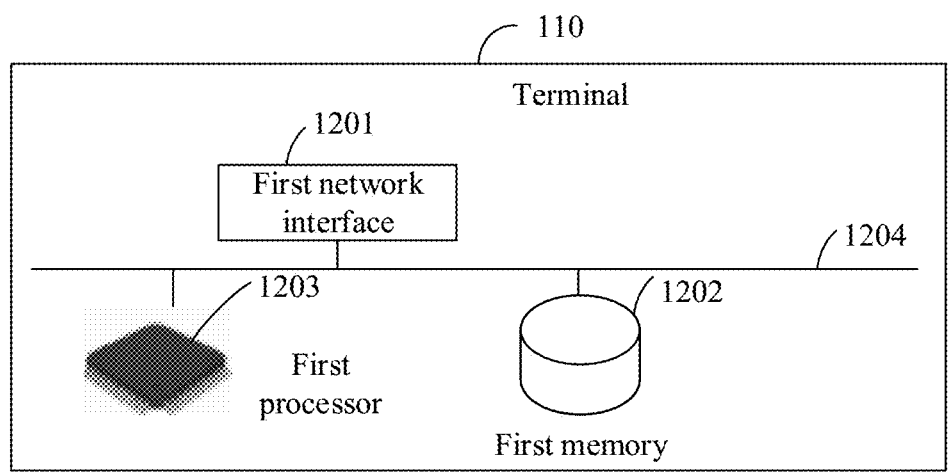
FIG. 12 illustrates a hardware structure diagram of a terminal according to an embodiment of the disclosure.

Based on the terminal 110 and the computer-readable medium, referring to FIG. 12, a specific hardware structure of the terminal 110 provided in the embodiment of the disclosure is illustrated, and may include a first network interface 1201, a first memory 1202 and a first processor 1203. Each component is coupled together through a bus system 1204. It can be understood that the bus system 1204 is configured to implement connection communication between these components. The bus system 1204 includes a data bus and further includes a power bus, a control bus and a state signal bus. However, for clear description, various buses in FIG. 12 are marked as the bus system 1204. The first network interface 1201 is configured to receive and send a signal in a process of receiving and sending information with another external network element.

The first memory 1202 is configured to store a computer program capable of running in the first processor 1203.

The first processor 1203 is configured to run the computer program to: receive allocation information for scheduling a time-domain resource from a network device, the time-domain resource to be scheduled including a time-domain resource required for channel transmission;

determine, according to a preset rule, a time-domain position corresponding to the time-domain resource to be scheduled based on UL and DL time-domain resource configuration information and the allocation information; and perform channel transmission through the time-domain resource to be scheduled according to the time-domain position corresponding to the time-domain resource to be scheduled.

It can be understood that the first memory 1202 in the embodiment of the disclosure may be a volatile memory or a nonvolatile memory, or may include both the volatile and nonvolatile memories. The nonvolatile memory may be a ROM, a programmable ROM (PROM), an erasable PROM (EPROM), an electrically EPROM (EEPROM) or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DRRAM). It is to be noted that the first memory 1202 of a system and method described in the disclosure is intended to include, but not limited to, memories of these and any other proper types.

The first processor 1203 may be an integrated circuit chip with a signal processing capability. In an implementation process, each operation of the method may be completed by an integrated logic circuit of hardware in the first processor 1203 or an instruction in a software form. The first processor 1203 may be a universal processor, a digital signal processor (DSP), an application specific integrated circuit (ASIC), a field programmable gate array (FPGA) or another programmable logic device (PLD), discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 1202. The first processor 1203 reads information in the first memory 1202 and completes the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSPDs, PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the allocation information for scheduling the time-domain resource includes number information of the time-domain resource to be scheduled.

Specifically, the first processor 803 in the terminal 110 is further configured to run the computer program to execute the steps of the time-domain resource determination method in embodiment 1. Elaborations are omitted herein.

Embodiment 5

Figure 13:
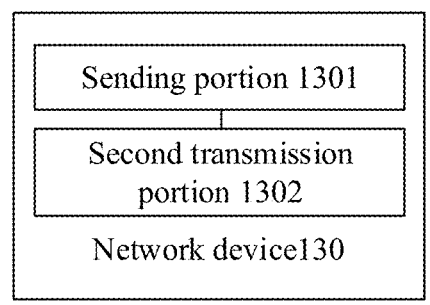
FIG. 13 illustrates a block diagram of a network device according to an embodiment of the disclosure.

Based on the same inventive concept of the abovementioned embodiments, referring to FIG. 13, a structure of a network device 130 provided in the embodiment of the disclosure is illustrated, and may include a sending portion 1301 and a second transmission portion 1302.

The sending portion 1301 is configured to send allocation information for scheduling a time-domain resource to a terminal. The time-domain resource to be scheduled includes a time-domain resource required for channel transmission and the allocation information is used for the terminal to determine a time-domain position corresponding to the time-domain resource to be scheduled.

The second transmission portion 1302 is configured to perform channel transmission through the time-domain resource to be scheduled according to the time-domain position corresponding to the time-domain resource to be scheduled.

In a possible implementation, the sending portion 1301 is further configured to send UL and DL time-domain resource configuration information to the terminal. The UL and DL time-domain resource configuration information includes at least one of slot-level position information or symbol-level position information of an available time-domain resource.

In a possible implementation, a channel includes a data channel or a control channel.

In a possible implementation, the allocation information for scheduling the time-domain resource may be carried in DCI.

In a possible implementation, the UL and DL time-domain resource configuration information is predefined information, or, the UL and DL time-domain resource configuration information is carried in at least one of RRC signaling or DCI.

In the implementation, the UL and DL time-domain resource configuration information may be at least one of frame structure information or an SFI.

In a possible implementation, the allocation information for scheduling the time-domain resource includes information about a number of the time-domain resources to be scheduled; or, the allocation information for scheduling the time-domain resource includes information about a number of the time-domain resources to be scheduled and information about a preselected position of each time-domain resource to be scheduled.

In addition, the embodiment provides a computer-readable medium having stored thereon a program that, when executed by at least one processor, implements the method of embodiment 2. Specific elaborations about the computer-readable medium refer to corresponding descriptions in embodiment 4 and are omitted herein.

Figure 14:
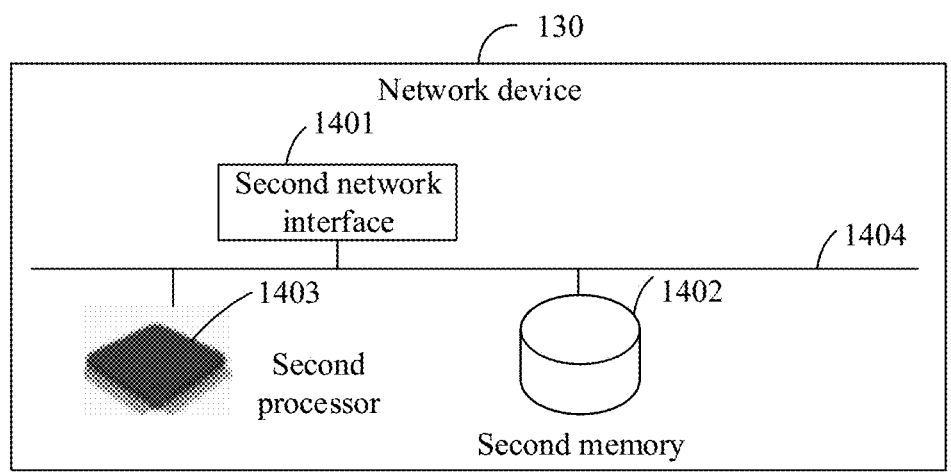
FIG. 14 illustrates a hardware structure diagram of a network device according to an embodiment of the disclosure.

Based on the network device 130 and the computer-readable medium, referring to FIG. 14, a specific hardware structure of the network device 130 provided in the embodiment of the disclosure is illustrated, which may include:

a second network interface 1401, a second memory 1402 and a second processor 1403. Each component is coupled together through a bus system 1404. It can be understood that the bus system 1404 is configured to implement connection communication between these components. The bus system 1404 includes a data bus and further includes a power bus, a control bus and a state signal bus. However, for clear description, various buses in FIG. 14 are marked as the bus system 1404.

Herein, the second network interface 1401 is configured to receive and send a signal in a process of receiving and sending information with another external network element.

The second memory 1402 is configured to store a computer program capable of running in the second processor 1403.

The second processor 1403 is configured to run the computer program to:

send allocation information for scheduling a time-domain resource to be scheduled to a terminal, the time-domain resource to be scheduled including a time-domain resource required for channel transmission and the allocation information being used for the terminal to determine a time-domain position corresponding to the time-domain resource to be scheduled; and perform channel transmission through the time-domain resource to be scheduled based on the time-domain position corresponding to the time-domain resource to be scheduled.

It can be understood that portions in the specific hardware structure of the network device 130 in the embodiment are similar to the corresponding portions described in embodiment 4 and will not be elaborated herein.

Specifically, the second processor 1403 in the network device 130 is further configured to run the computer program to execute the operations of the time-domain resource determination method in embodiment 2. Elaborations are omitted herein.

Embodiment 6

Figure 15:
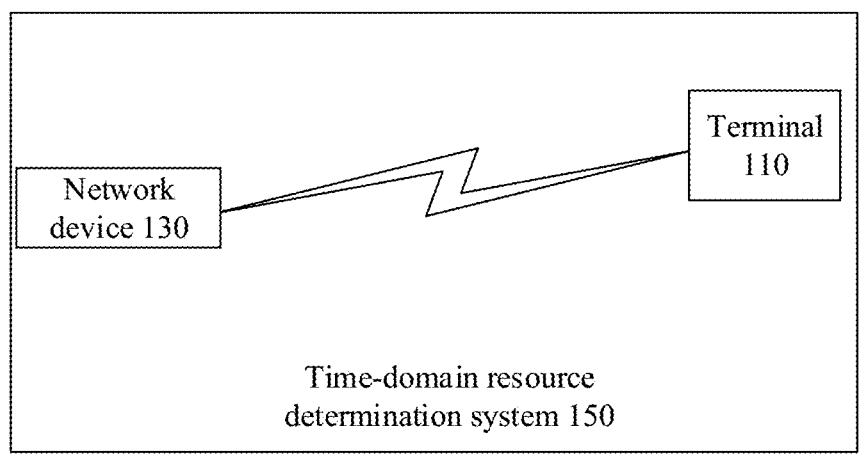
FIG. 15 illustrates a schematic diagram of composition of a system for determining a time-domain resource according to an embodiment of the disclosure.

Based on the same inventive concept of the abovementioned embodiments, referring to FIG. 15, a time-domain resource determination system 150 provided in the embodiment of the disclosure is illustrated, and may include a terminal 110 and a network device 130.

The network device 130 is configured to send allocation information for scheduling a time-domain resource to the terminal 110, the time-domain resource to be scheduled including a time-domain resource required for channel transmission and the allocation information being used for the terminal to determine a time-domain position corresponding to the time-domain resource to be scheduled, and perform channel transmission through the time-domain resource to be scheduled based on the time-domain position corresponding to the time-domain resource to be scheduled.

The terminal 110 is configured to receive the allocation information for scheduling the time-domain resource from the network device 130, the time-domain resource to be scheduled including the time-domain resource required for channel transmission, determine, according to a preset rule, the time-domain position corresponding to the time-domain resource to be scheduled based on UL and DL time-domain resource configuration information and the allocation information, and perform channel transmission through the time-domain resource to be scheduled based on the time-domain position corresponding to the time-domain resource to be scheduled.

In a specific implementation process, the network device 130 in the embodiment may preferably be the network device 130 in any abovementioned embodiment, and the terminal 110 may preferably be the terminal 110 in any abovementioned embodiment.

It is to be noted that the technical solutions recorded in the embodiments of the disclosure may be freely combined without conflicts.

The above is only the preferred embodiment of the disclosure and not intended to limit the scope of protection of the disclosure.

INDUSTRIAL APPLICABILITY

In the embodiments, the terminal determines the time-domain position corresponding to the time-domain resource to be scheduled according to the rule predetermined with a base station to make the determined time-domain position is consistent with scheduling information obtained after the base station adjusts the time-domain resource to be scheduled, so that the condition that the terminal may not transmit a channel within a short period of time due to a conflict between the time-domain resource configuration information and the time-domain resource scheduling information during channel transmission of the terminal is avoided, a signaling overhead during channel transmission of the terminal and the base station is also reduced, and false detection probability increase caused by repeated sending of control signaling is further avoided.

The invention claimed is:

1. A method for determining a time-domain resource, implemented by a terminal, the method comprising:
    receiving allocation information for scheduling a time-domain resource from a network device, wherein the time-domain resource to be scheduled comprises a time-domain resource required for channel transmission, the allocation information for scheduling the time-domain resource comprises information about a number of time-domain resources to be scheduled, and the time-domain resources to be scheduled are slots;
    receiving uplink (UL) and downlink (DL) time-domain resource configuration information from the network device;
    determining, according to a preset rule, a time-domain position corresponding to the time-domain resource to be scheduled based on the UL and DL time-domain resource configuration information and the allocation information, wherein the preset rule is a determination rule predetermined by negotiation between the terminal and the network device, and comprises a regulation manner for the network device to regulate the time-domain resource in case of a conflict between a scheduling of the time-domain resource and a configuration of the time-domain resource; and
    performing the channel transmission through the time-domain resource to be scheduled based on the time-domain position corresponding to the time-domain resource to be scheduled,
    wherein determining, according to the preset rule, the time-domain position corresponding to the time-domain resource to be scheduled based on the UL and DL time-domain resource configuration information and the allocation information comprises:
        determining time-domain resource candidates for the time-domain resources to be scheduled based on the UL and DL time-domain resource configuration information, wherein a number of the time-domain resource candidates is the same as the number of the time-domain resources to be scheduled, and there is no conflict between the time-domain resource candidates and the UL and DL time-domain resource configuration information, wherein the conflict represents that a transmission direction indicated by the UL and DL time-domain resource configuration information is opposite to a channel transmission direction of the time-domain resources to be scheduled; and
        determining time-domain positions corresponding to the time-domain resources to be scheduled by filling the time-domain resources to be scheduled into the time-domain resource candidates.

2. The method of claim 1, wherein filling the time-domain resources to be scheduled into the time-domain resource candidates comprises:
    the time-domain resources to be scheduled are sequentially filled into the time-domain resource candidates.

3. The method of claim 1, wherein the allocation information for scheduling the time-domain resource further comprises information about a preselected position of each time-domain resource to be scheduled.

4. The method of claim 3, wherein determining, according to the preset rule, the time-domain position corresponding to the time-domain resource to be scheduled based on the UL and DL time-domain resource configuration information and the allocation information comprises:
    S1: determining, from preselected positions of the time-domain resources to be scheduled, a conflicting time-domain resource position based on the UL and DL time-domain resource configuration information, wherein the conflicting time-domain resource position is a time-domain resource position in the UL and DL time-domain resource configuration information, with a channel transmission direction opposite to a channel transmission direction of the time-domain resources to be scheduled;
    S2: moving the conflicting time-domain resource position in the preselected positions to a non-conflicting time-domain resource position immediately following the conflicting time-domain resource position;
    S3: delaying a preselected position, after the conflicting time-domain resource position, in the preselected positions according to a delay offset of the conflicting time-domain resource position;
    S4: judging whether a conflicting time-domain resource position exists in the moved preselected positions or not based on the UL and DL time-domain resource configuration information, if YES, turning to S2 until no conflicting time-domain resource position exists in the moved preselected positions and executing S5, otherwise executing S5; and
    S5: determining time-domain positions corresponding to the time-domain resources to be scheduled by sequentially filling the time-domain resources to be scheduled into the moved preselected positions.

5. The method of claim 1, wherein a channel comprises a data channel or a control channel.

6. The method of claim 1, wherein the allocation information for scheduling the time-domain resource is carried in downlink control information (DCI).

7. The method of claim 1, wherein the UL and DL time-domain resource configuration information comprises at least one of slot-level position information or symbol-level position information of an available time-domain resource.

8. The method of claim 1, wherein the UL and DL time-domain resource configuration information is predefined information; or,
the UL and DL time-domain resource configuration information is carried in at least one of radio resource control (RRC) signaling or DCI.

9. The method of claim 8, wherein the UL and DL time-domain resource configuration information comprises at least one of frame structure information or a slot format indicator (SFI).

10. A terminal, comprising a receiver, a processor and a first transmitter, wherein
the receiver is configured to receive allocation information for scheduling a time-domain resource from a network device, wherein the time-domain resource to be scheduled comprises a time-domain resource required for channel transmission, the allocation information for scheduling the time-domain resource comprises information about a number of time-domain resources to be scheduled, and the time-domain resources to be scheduled are slots;
the receiver is further configured to receive uplink (UL) and downlink (DL) time-domain resource configuration information from the network device;
the processor is configured to determine, according to a preset rule, a time-domain position corresponding to the time-domain resource to be scheduled based on the UL and DL time-domain resource configuration information and the allocation information, wherein the preset rule is a determination rule predetermined by negotiation between the terminal and the network device, and comprises a regulation manner for the network device to regulate the time-domain resource in case of a conflict between a scheduling of the time-domain resource and a configuration of the time-domain resource; and
the first transmitter is configured to perform the channel transmission through the time-domain resource to be scheduled based on the time-domain position corresponding to the time-domain resource to be scheduled,
wherein the processor is configured to:
determine time-domain resource candidates for the time-domain resources to be scheduled based on the UL and DL time-domain resource configuration information, wherein a number of the time-domain resource candidates is the same as the number of the time-domain resources to be scheduled, and there is no conflict between the time-domain resource candidates and the UL and DL time-domain resource configuration information, wherein the conflict represents that a transmission direction indicated by the UL and DL time-domain resource configuration information is opposite to a channel transmission direction of the time-domain resources to be scheduled; and
determine the time-domain positions corresponding to the time-domain resources to be scheduled by filling the time-domain resources to be scheduled into the time-domain resource candidates.

11. The terminal of claim 10, wherein the processor is configured to sequentially fill the time-domain resources to be scheduled into the time-domain resource candidates.

12. The terminal of claim 10, wherein the allocation information for scheduling the time-domain resource further comprises information about a preselected position of each time-domain resource to be scheduled.

13. The terminal of claim 12, wherein the processor is configured to:
S1: determine, from preselected positions of the time-domain resources to be scheduled, a conflicting time-domain resource position based on the UL and DL time-domain resource configuration information, wherein the conflicting time-domain resource position is a time-domain resource position, in the UL and DL time-domain resource configuration information, with a channel transmission direction opposite to a channel transmission direction of the time-domain resources to be scheduled;
S2: move the conflicting time-domain resource position in the preselected positions to a non-conflicting time-domain resource position immediately following the conflicting time-domain resource position;
S3: delay a preselected position, after the conflicting time-domain resource position, in the preselected positions according to a delay offset of the conflicting time-domain resource position;
S4: judge whether a conflicting time-domain resource position exists in the moved preselected positions or not based on the UL and DL time-domain resource configuration information, if YES, turn to S2 until no conflicting time-domain resource position exists in the moved preselected positions and execute S5, otherwise execute S5; and
S5: determine the time-domain positions corresponding to the time-domain resources to be scheduled by sequentially filling the time-domain resources to be scheduled into the moved preselected positions.

14. The terminal of claim 10, wherein the UL and DL time-domain resource configuration information comprises at least one of slot-level position information or symbol-level position information-of an available time-domain resource.

15. The terminal of claim 10, wherein a channel comprises a data channel or a control channel.

16. The terminal of claim 10, wherein the allocation information for scheduling the time-domain resource is carried in downlink control information (DCI).

17. The terminal of claim 10, wherein the UL and DL time-domain resource configuration information is predefined information; or,
the UL and DL time-domain resource configuration information is carried in at least one of radio resource control (RRC) signaling or DCI.

18. The terminal of claim 17, wherein the UL and DL time-domain resource configuration information comprises at least one of frame structure information or a slot format indicator (SFI).

* * * * *